(12) United States Patent
Szabo et al.

(10) Patent No.: US 8,817,655 B2
(45) Date of Patent: *Aug. 26, 2014

(54) CREATING AND USING MULTIPLE PACKET TRAFFIC PROFILING MODELS TO PROFILE PACKET FLOWS

(75) Inventors: Geza Szabo, Kecskemet (HU); Gergely Pongrácz, Budapest (HU); Zoltan Turányi, Szentendre (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 379 days.

This patent is subject to a terminal disclaimer.

(21) Appl. No.: 13/277,735

(22) Filed: Oct. 20, 2011

(65) Prior Publication Data

US 2013/0100849 A1 Apr. 25, 2013

(51) Int. Cl.
*H04L 12/26* (2006.01)

(52) U.S. Cl.
USPC ............ 370/253; 370/401; 370/477; 709/238

(58) Field of Classification Search
None
See application file for complete search history.

(56) References Cited

U.S. PATENT DOCUMENTS

| | | | |
|---|---|---|---|
| 6,937,561 B2 | 8/2005 | Chiussi et al. | |
| 7,225,271 B1 * | 5/2007 | DiBiasio et al. | ............... 709/240 |
| 7,594,260 B2 | 9/2009 | Porras et al. | |
| 7,664,048 B1 | 2/2010 | Yung et al. | |
| 7,702,806 B2 | 4/2010 | Gil et al. | |
| 7,891,001 B1 | 2/2011 | Greenawalt et al. | |
| 2003/0009585 A1 | 1/2003 | Antoine et al. | |
| 2009/0106839 A1 | 4/2009 | Cha et al. | |
| 2009/0138420 A1 | 5/2009 | Swift et al. | |
| 2010/0014420 A1 | 1/2010 | Wang et al. | |
| 2010/0034102 A1 | 2/2010 | Wang et al. | |
| 2010/0071061 A1 | 3/2010 | Crovella et al. | |
| 2010/0284274 A1 * | 11/2010 | Ghanadan et al. | ......... 370/230.1 |
| 2011/0019574 A1 * | 1/2011 | Malomsoky et al. | ......... 370/252 |
| 2012/0278890 A1 | 11/2012 | Maatta et al. | |
| 2012/0281590 A1 * | 11/2012 | Szabo et al. | .................. 370/253 |
| 2013/0100849 A1 | 4/2013 | Szabo et al. | |

FOREIGN PATENT DOCUMENTS

| | | |
|---|---|---|
| CN | 101594303 A | 12/2009 |
| WO | WO 2008/067758 A1 | 6/2008 |

OTHER PUBLICATIONS

U.S. Appl. No. 13/098,944, filed May 2, 2011; Inventor: Szabo et al.
U.S. Appl. No. 13/315,037, filed Dec. 8, 2011; Inventor: Szabo et al.
R. Bar-Yanai, M. Langberg, D. Peleg, and L. Roditty, "Realtime classification for encrypted traffic," in SEA, 2010, pp. 373-385.
Bernaille et al., Traffic Classification on the Fly, LIP6, ACM SIGCOMM Computer Communication Review, vol. 36, Issue 2, Apr. 2006, 4 pages.

(Continued)

*Primary Examiner* — Chi Pham
*Assistant Examiner* — Shick Hom
(74) *Attorney, Agent, or Firm* — Nixon & Vanderhye P.C.

(57) ABSTRACT

Hybrid packet traffic flow profiling technology inspects packet headers to classify packet traffic flows using clustering models developed using unsupervised learning based on known packet traffic flows and one or more traffic classification models developed using supervised learning based on the known packet traffic flows.

31 Claims, 8 Drawing Sheets

(56) References Cited

OTHER PUBLICATIONS

A. W. Moore and D. Zuev, "Internet Traffic Classification Using Bayesian Analysis Techniques," in *Proc. SIGMETRICS*, Banff, Alberta, Canada, Jun. 2005.

A. W. Moore, Q. Mary, D. Zuev and M. L. Crogan, "Discriminators for use in flowbased classification," Tech. Rep., 2005.3.

J. H. Plasberg and W. B. Kleijn, "Feature selection under a complexity constraint," *Trans. Multi.*, vol. 11, No. 3, pp. 565-571, 2009.

M. Pietrzyk, J.-L. Costeux, G. Urvoy-Keller, and T. En-Najjary, "Challenging statistical classification for operational usage: the adsl case," in *IMC '09: Proceedings of the 9th ACM SIGCOMM conference on Internet measurement conference*. New York, NY, USA: ACM, 2009, pp. 122-135.

Sean Borman: The Expectation Maximization Algorithm Jul. 18, 2004 http://www.seanborman.com/publications/EM_algorithm.pdf, Jul. 18, 2004.

J.P.Lewis: A Short SVM (Support Vector Machine) Dec. 2004 Tutorial http://scribblethink.org/Work/Notes/svmtutorial.pdf, Dec. 2004.

Office Action dated Feb. 24, 2014 in U.S. Appl. No. 13/315,037, pp. 1-46.

Office Action dated Sep. 16, 2013 in U.S. Appl. No. 13/098,944, pp. 1-16.

European Communication and Partial European Search Report mailed Aug. 1, 2012 in EP Application No. 12002203.3.

Chaudhary et al., "Flow Classification Using Clustering and Association Rule Mining", 15$^{th}$ IEEE International Workshop on Computer Aided Modeling, Analysis and Design of Communication Links and Networks (CAMAD), Dec. 3, 2010, pp. 76-80, XP031848680.

Garcia et al., "Measuring and Profiling IP Traffic", Fourth European Conference on Universal Multiservice Networks (ECUMN'07), Feb. 1, 2007, pp. 283-291, XP031052675.

Kuai et al., "A Real-time Network Traffic Profiling System", 37th Annual IEEE/IFIP International Conference Dependable Systems and Networks (DSN'07), pp. 595-605, 2007.

\* cited by examiner

| Features | | | | | Test result | | |
|---|---|---|---|---|---|---|---|
| Flow ID | avg IAT | psize dev | sum byte | time len | Label | Classification | Clustering (hard) | Clustering (soft) |
| 1 | 35 | 10 | 61 | 35 | P2P | P2P | 1 | 1(80%), 2(15%) |
| 2 | 77 | 37 | 87 | 9 | P2P | P2P | 1 | 1(75%),3(10%) |
| 3 | 80 | 46 | 58 | 38 | E-mail | P2P | 2 | 2(95%) |
| 4 | 66 | 0 | 79 | 51 | VoIP | VoIP | 3 | 3(45%),2(9%) |

# CREATING AND USING MULTIPLE PACKET TRAFFIC PROFILING MODELS TO PROFILE PACKET FLOWS

RELATED APPLICATION

This application is related to U.S. patent application entitled, "Creating and using multiple packet traffic profiling models to profile packet flows," Ser. No. 13/098,944, filed on May 2, 2011, the contents of which are incorporated herein by reference.

TECHNICAL FIELD

The technology relates to packet traffic profiling and creating models to perform such profiling.

BACKGROUND

Efficient allocation of network resources, such as available network bandwidth, has become critical as enterprises increase reliance on distributed computing environments and wide area computer networks to accomplish critical tasks. Transport Control Protocol (TCP)/Internet Protocol (IP) protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

Bandwidth management in TCP/IP networks to allocate available bandwidth from a single logical link to network flows is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management including some partitioning and prioritizing of separate traffic classes. However, configuring these queuing options with any precision or without side effects is in fact very difficult, and in some cases, not possible.

Bandwidth management devices allow for explicit data rate control for flows associated with a particular traffic classification. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions to ensure a minimum bandwidth and/or cap bandwidth as to a particular class of traffic. After identification of a traffic type corresponding to a data flow, a bandwidth management device associates and subsequently applies bandwidth utilization controls (e.g., a policy or partition) to the data flow corresponding to the identified traffic classification or type.

More generally, in-depth understanding of a packet traffic flow's profile is a challenging task but nevertheless is a requirement for many Internet Service Providers (ISP). Deep Packet Inspection (DPI) may be used to perform such profiling to allow ISPs to apply different charging policies, perform traffic shaping, and offer different quality of service (QoS) guarantees to selected users or applications. However, DPI has a number of disadvantages including being a slow procedure, resource consuming, and unable to recognize types of traffic in which there is no signature set. Many critical network services may rely on the inspection of packet payload content, but there can be use cases when only looking at the structured information found in packet headers is feasible.

Traffic classification systems may include a training phase and a testing phase during which traffic is actually classified based on the information acquired in the training phase. FIG. 1 is diagram of a training operation to create multiple packet traffic flow models. The input of the training phase includes known packet traffic flows, and the output includes multiple packet traffic flow models. Packet traffic flow descriptors like average payload size, etc. (described in more detail below) are determined from the known packet traffic flows and used to generate clusters which are used to create the multiple packet traffic flow models. The models are stored for later use to profile unknown packet traffic flows.

FIG. 2 is diagram of packet traffic flow profiling using multiple packet traffic flow models created in FIG. 1. Unknown packet traffic flows are received and processed to determine multiple flow descriptors (in a similar way as in the training phase) with a particular accuracy and confidence level. The multiple packet traffic flow models created in the training phase are loaded and tested on the input data, and the one of them is selected to profile a particular one of the unknown traffic flows.

Unfortunately, in existing packet header-based traffic classification systems, the effects of network environment changes and the characteristic features of specific communications protocols are not identified and then considered together. But because each change and characteristic feature affects one or more of the other changes and characteristic features, the failure to consider them together along with respective interdependencies results in reduced accuracy when testing traffic a different network than was used the training phase was using.

Packet inspection methods typically either use supervised machine learning or unsupervised machine learning but do not use them together. One type of machine learning may perform well on one particular network but perform less accurately on another network. However, the above-identified application describes an approach where both supervised machine learning and unsupervised machine learning are used together in order to classify traffic with improved accuracy and performance. The inventors recognized that unsupervised learning had certain advantages and disadvantages which differ from those associated with supervised learning and that even better accuracy and performance may be achieved by exploiting those advantages and minimize the disadvantages in the creation and use of traffic profiling models.

SUMMARY

A first aspect of the technology relates to creating multiple packet traffic clustering models and multiple packet traffic classification models. Multiple known packet traffic flows are processed in which determine for each known packet traffic flow multiple traffic flow descriptors describing physical parameters of the known packet traffic flow and at least one traffic flow label describing a type of packet traffic flow. The at least one label is determined for each of the known packet traffic flows by deep packet inspection of packets in that known packet traffic flow. A subset of the traffic flow descriptors is selected which includes traffic flow features that are then associated with a corresponding one of the known packet traffic flows. Such traffic flow descriptors are selected and associated for each of the know packet traffic flows. Unsupervised learning implemented by a computer is used to define traffic flow clustering models by processing the traffic flow features associated with each of the known packet traffic flows. In one example embodiment, the traffic clustering models classifies packet traffic flows into clusters. Supervised learning implemented by a computer is used to create traffic classification models based on the created traffic flow clustering models, the traffic flow features, and the traffic flow label associated with each of the known packet traffic flows. The traffic clustering models and the traffic classification models are stored in memory for subsequent traffic profiling.

Non-limiting example traffic flow features include one or more of: average packet inter-arrival time for a packet traffic flow, packet size deviation in a packet traffic flow, sum of bytes in a flow, time duration of a packet traffic flow, TCP flags set in a packet traffic flow, packet direction in a packet traffic flow, a number of packet direction changes, a number of transported packets for a packet traffic flow until a first packet direction change, or a statistically-filtered time series related to a packet traffic flow. Non-limiting example types of packet traffic flows include one of: a point-to-point traffic flow type, an e-mail traffic flow type, a web traffic flow type, and a voice over internet protocol (VoIP) traffic flow type.

Non-limiting examples of unsupervised learning include one or more of the following techniques: expectation maximalization, K-Means, cobweb hierarchic clustering, shared neighbor clustering, and constrained clustering. Non-limiting examples of supervised learning include one or more of the following techniques: Support Vector Machine (SVM), logistic regression, naive Bayes, naive Bayes simple, logit boost, random forest, multilayer perception, J48, and Bayes net.

The technology may be implemented in or connected to, for example, one or more of the following: a radio base station, a Serving GPRS Support Node (SGSN), Gateway GPRS Support Node (GGSN), Broadband Remote Access Server (BRAS), or Digital Subscriber Line Access Multiplexer (DSLAM).

A second aspect of the technology relates to profiling packet traffic flows. One or more unknown packet traffic flows are received. Each unknown packet traffic flow is processed to associate it with multiple traffic flow descriptors describing physical parameters of the unknown packet traffic flow. A subset of the traffic flow descriptors is selected as traffic flow features which are associated with a corresponding one of the unknown packet traffic flow. This is done for each unknown packet traffic flow. The traffic flow features are processed using one or more traffic clustering models developed using computer-implemented unsupervised learning based on known packet traffic flows and one or more traffic classification models developed using computer-implemented supervised learning based on the known packet traffic flows to determine a traffic type for the unknown packet traffic flow. The determined traffic type may be associated with a confidence value that includes a packet traffic profiling accuracy.

In an example embodiment, the processing of the selected traffic flow features includes testing the unknown packet traffic flows by applying them to the one or more traffic clustering models, and selecting the one or more traffic classification models based on an output of the one or more traffic clustering models.

Again, this second aspect of the technology may be implemented in or connected to, for example, one or more of the following: a radio base station, a Serving GPRS Support Node (SGSN), Gateway GPRS Support Node (GGSN), Broadband Remote Access Server (BRAS), or Digital Subscriber Line Access Multiplexer (DSLAM).

A third aspect of the technology relates to an apparatus for creating multiple packet traffic profiling clustering models and multiple packet traffic classification models. A monitoring processor associates each known packet traffic flow with multiple traffic flow descriptors describing physical parameters of the known packet traffic flow and at least one traffic flow label describing a type of packet traffic flow. A selecting processor selects and associates a subset of the traffic flow descriptors as corresponding traffic flow features for each of the known packet traffic flows. A cluster data processor uses unsupervised learning to automatically define traffic flow clustering models by processing the corresponding traffic flow features associated with each of the known packet traffic flows. A classification data processor uses supervised learning to automatically create traffic classification models based on the created traffic flow clustering models, the traffic flow features, and the traffic flow label associated with each of the known packet traffic flows. A memory stores the traffic clustering models and the traffic classification models.

A fourth aspect of the technology relates to an apparatus for profiling packet traffic flows. An evaluation data processor evaluates one or more unknown packet traffic flows and associates each unknown packet traffic flow with multiple traffic flow descriptors describing physical parameters of the unknown packet traffic flow. A selection unit selects a subset of the traffic flow descriptors as corresponding traffic flow features to be associated with each of the unknown packet traffic flows. A profiling data processor processes the corresponding traffic flow features for each of the unknown packet traffic flows using one or more traffic clustering models developed using unsupervised learning based on known packet traffic flows and one or more traffic classification models developed using supervised learning based on the known packet traffic flows to determine a traffic type for each of the unknown packet traffic flows.

DETAILED DESCRIPTION

Figure 1:
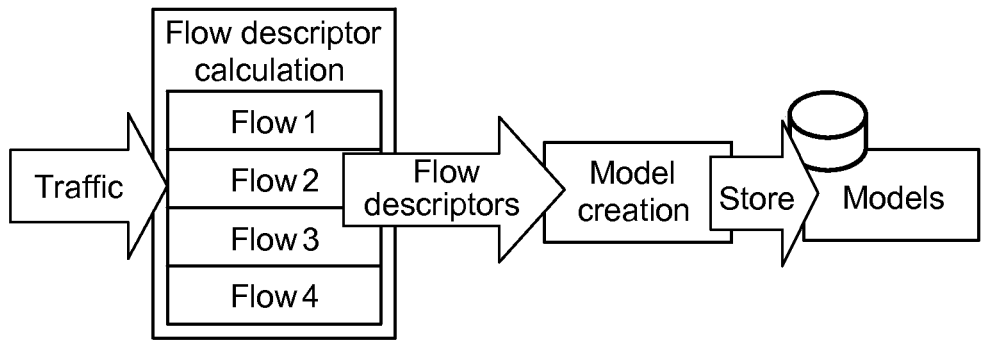
FIG. 1 is diagram of a training operation to create multiple packet traffic flow models.
Figure 2:
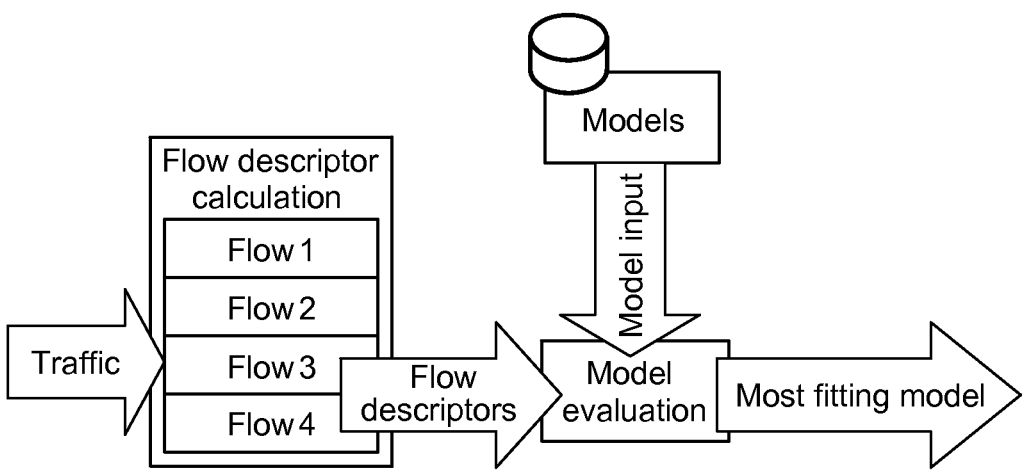
FIG. 2 is diagram of packet traffic flow profiling using multiple packet traffic flow models created in FIG. 1.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks may are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. The software program instructions and data may be stored on computer-readable storage medium, and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology described in this case may be applied to any communications system and/or network. A network device, e.g., a hub, switch, router, and/or a variety of combinations of such devices implementing a LAN or WAN, interconnects two other end nodes such as a client device and a server. The network device may include a traffic monitoring module connected to a part of a communications path between the client device and the server to monitor one or more packet traffic flows. The network device may also include a training module for generating multiple packet traffic flow models used by the traffic monitoring module. Alternatively, the training module may be provided in a separate node from the network device, and the multiple packet traffic flow models are in that case provided to the traffic monitoring module. In one example embodiment, the training module and the traffic monitoring module each employ a combination of hardware and software, such as a central processing unit, memory, a system bus, an operating system and one or more software modules implementing the functionality described herein. The functionality of traffic monitoring device can be integrated into a variety of network devices that classify network traffic, such as firewalls, gateways, proxies, packet capture devices, network traffic monitoring and/or bandwidth management devices, that are typically located at strategic points in computer networks.

As explained in the background, a problem with known packet inspection methods is that they use supervised machine learning or unsupervised machine learning but do not use them together. One type of machine learning may perform well on one particular network but perform less accurately on another network. In addition to using both supervised learning and unsupervised machine learning together, the technology recognized that unsupervised learning had certain advantages and disadvantages which differ from those associated with supervised learning and that even better accuracy and performance may be achieved by exploiting those advantages and minimize the disadvantages in the creation and use of traffic profiling models.

Figure 3:
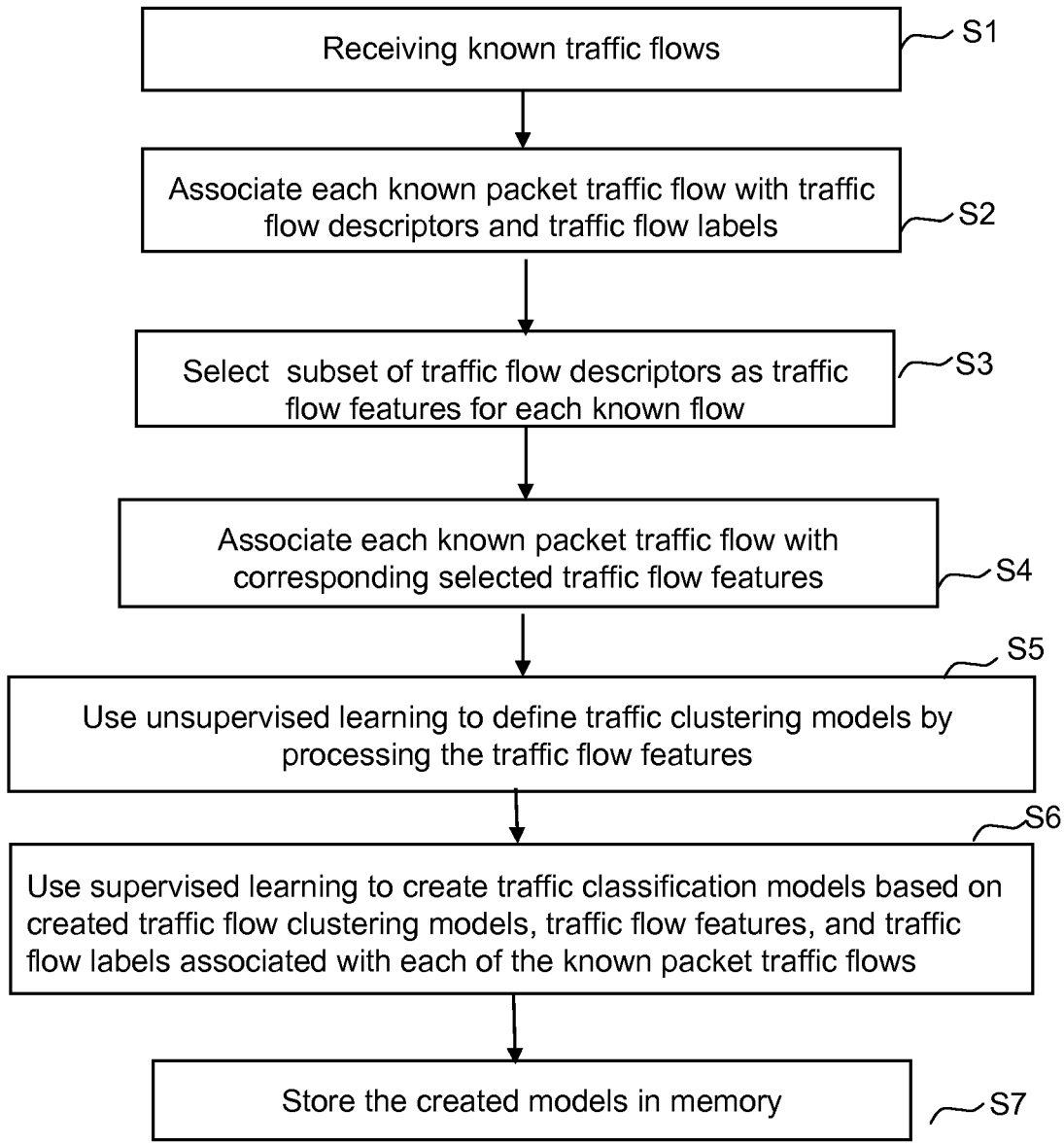
FIG. 3 is a non-limiting flowchart illustrating example procedures for creating multiple packet traffic flow models.

FIG. 3 is a non-limiting flowchart illustrating example procedures for creating packet traffic flow models. Initially, multiple known packet traffic flows are generated or received (step S1). Each known packet traffic flows is processed to associate it with (1) multiple traffic flow descriptors describing physical parameters of the known packet traffic flow and (2) one or more traffic flow label describing a type of packet traffic flow (step S2). Non-limiting example traffic flow features include one or more of: average packet inter-arrival time for a packet traffic flow, packet size deviation in a packet traffic flow, sum of bytes in a flow, time duration of a packet traffic flow, TCP flags set in a packet traffic flow, packet direction in a packet traffic flow, a number of packet direction changes, a number of transported packets for a packet traffic flow until a first packet direction change, or a statistically-filtered time series related to a packet traffic flow. Non-limiting example types of packet traffic flows include one of: a point-to-point traffic flow type, an e-mail traffic flow type, a voice over internet protocol (VoIP) traffic flow type.

A subset of the traffic flow descriptors is selected as traffic flow features for each of the known packet traffic flows (step S3). Each known packet traffic flow is associated with corresponding selected traffic flow features (step S4). Computer-based unsupervised learning is used to automatically define traffic flow clustering models by processing the traffic flow features associated with each of the known packet traffic flows (step S5). Computer-based supervised learning is used to automatically create traffic classification models using the created traffic flow clustering models, the traffic flow features, and the traffic flow label associated with each of the known packet traffic flows (step S6). The created traffic clustering models and the traffic classification models are in memory for subsequent use to aid in classifying unknown traffic flows (step S7).

Figure 4:
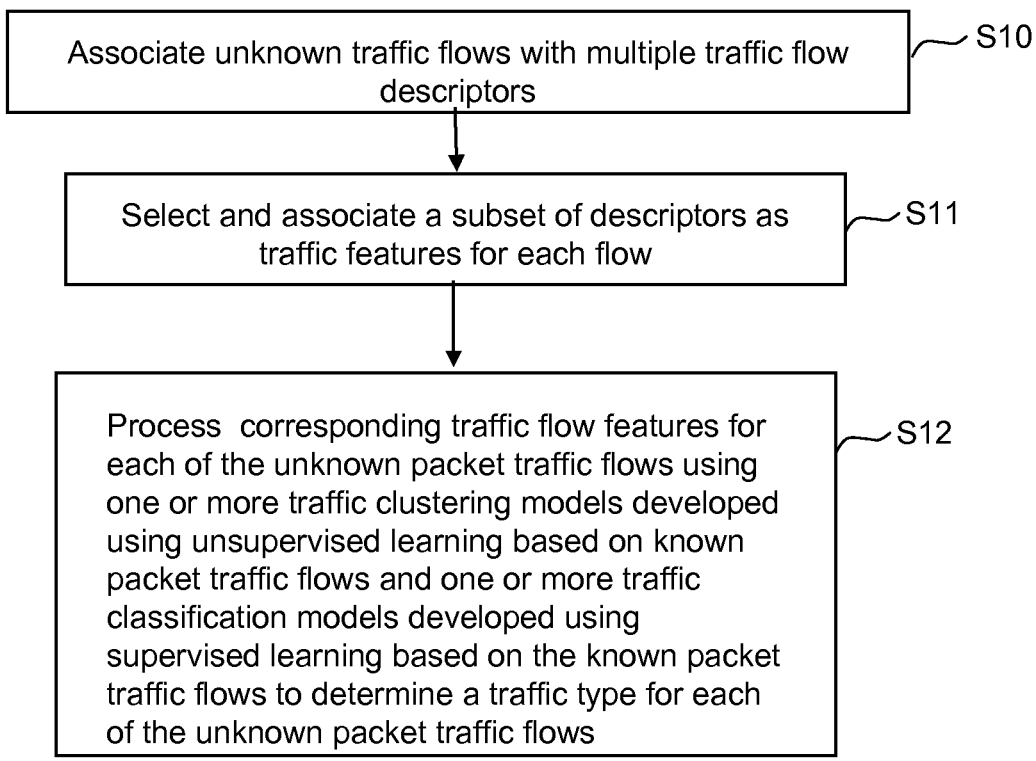
FIG. 4 is a non-limiting flowchart illustrating example procedures for packet traffic flow profiling using multiple packet traffic flow models.

FIG. 4 is a non-limiting flowchart illustrating example procedures for packet traffic flow profiling using multiple packet traffic flow models such as those created in FIG. 3. One or more unknown packet traffic flows is received, and each unknown packet traffic flow is processed to associate it with multiple traffic flow descriptors describing physical parameters of the unknown packet traffic flow (step S10). A subset of the traffic flow descriptors is selected and associated as corresponding traffic flow features for each of the unknown packet traffic flows (step S11). The corresponding traffic flow features for each of the unknown packet traffic flows are processed using one or more traffic clustering models developed using unsupervised learning based on known packet traffic flows and one or more traffic classification models developed using supervised learning based on the known packet traffic flows to determine a traffic type for each of the unknown packet traffic flows (step S12).

Figures 5, 6A, 6B:
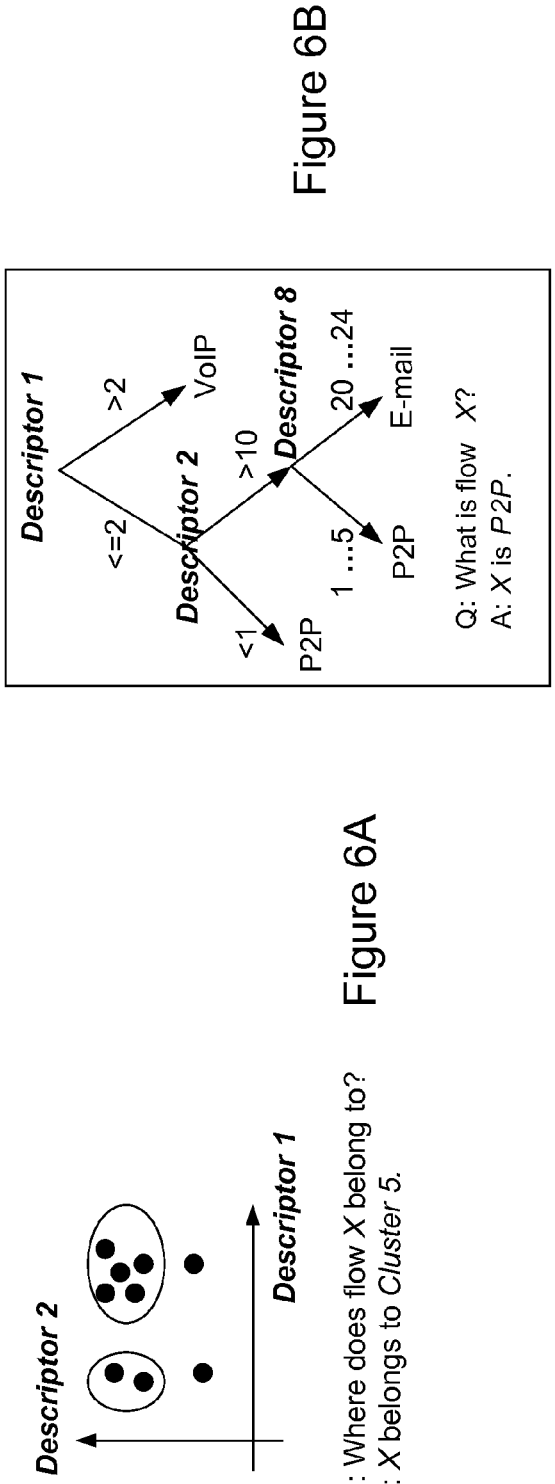
FIG. 5 is a non-limiting, example of multiple packet traffic flows with example features, labels, classifications, and clusterings.
FIGS. 6A and 6B provide example illustrations of clustering and classification.

FIG. 5 is a non-limiting, example of multiple packet traffic flows with example features, labels, classifications, and clusterings. Each of the four example flows has a flow identifier (ID), assigned features, and a label. The example features for a packet traffic flow in this figure include one or more of: average packet inter-arrival time for a packet traffic flow (avg IAT), packet size deviation (psize dev) in a packet traffic flow, sum of bytes (sum byte) in a flow, time duration (time len) of a packet traffic flow. The test results for the traffic profiling of these flows is a traffic flow type classification (e.g., point-to-point (P2P), email, and voice over IP (VoIP)), a hard clustering result (e.g., 1, 2, or 3 with each number corresponding to a specific cluster), and a soft clustering result where the result is associated with a confidence value, (e.g., a certainty percentage). The test results show that flows 1, 2, and 4 are profiled correctly because the label for the flow matches its classification. On the other hand, the label for flow 3, email, differs from its classification of P2P.

FIG. 6A provides an example illustration of clustering which is unsupervised learning. The circled areas represent clusters of points where traffic flow descriptors 1 and 2 intersect. One cluster includes two points and the other five points. FIG. 6B provides an example illustration of classification which is supervised learning where features and labels are considered. The classification process is carried out using a decision tree in which several decisions are made on the descriptors (features and labels) of the flow. At the end of the decision tree process, the traffic flow is identified/classified.

Figure 7:
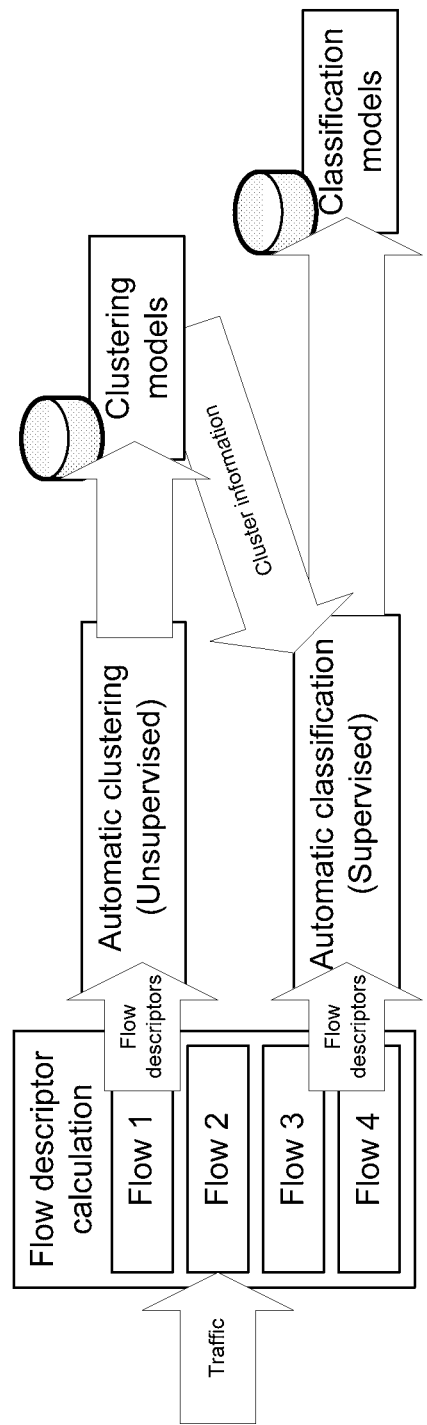
FIG. 7 is a non-limiting, example diagram illustrating functions outlined in FIG. 3.

FIG. 7 is a non-limiting, example diagram illustrating clustering and classification model creation based on known traffic flows in accordance with the steps outlined in FIG. 3. The input of the training phase is the labeled raw traffic, which in this example includes four known packet traffic flows 1-4. First, traffic flow descriptors are determined for each of the four known packet traffic flows 1-4 such as average payload size, deviation of payload size, etc. Traffic flow descriptors may be determined, for example, from information read from the packet header and/or by calculation using suitable mathematical equations. A feature selection stage selects for each of the four known packet traffic flows 1-4 a corresponding subset of the determined descriptors as traffic flow features. The descriptors may, for example, be ranked according to information gain content, and one or more of the highest ranked descriptors may be selected as traffic flow features. Next, automatic unsupervised clustering is performed using the selected features for each of the four known packet traffic flows 1-4, and the resulting traffic flow clustering models are stored. Non-limiting examples of known computer-implemented unsupervised learning methods include: expectation maximization (EM), K-Means, cobweb hierarchic clustering, shared neighbor clustering, and constrained clustering.

The results of the clustering, including a clustering model which may be viewed as a condensed description of the training data, and the selected features for each of the four known packet traffic flows 1-4 are processed in an automatic supervised classification system to produce traffic flow classification models. The automatic supervised classification system may process this information in a number of ways. One example way is to feed the clustering model/result, with a cluster-to-application mapping having been performed, to the classification models as a new feature. The term "application" refers to one or more computer applications that can generate the various packet traffic flows. In this example, the feature expressiveness may be chosen arbitrarily by the classification method. Another example way is to feed each resulting cluster (without cluster-to-application mapping) to classification models one-by-one. Non-limiting examples of known computer-implemented supervised learning methods include: Support Vector Machine (SVM), logistic regression, naive Bayes, naive Bayes simple, logit boost, random forest, multilayer perception, J48, and Bayes net. The resulting classification models are also stored.

Figure 8:
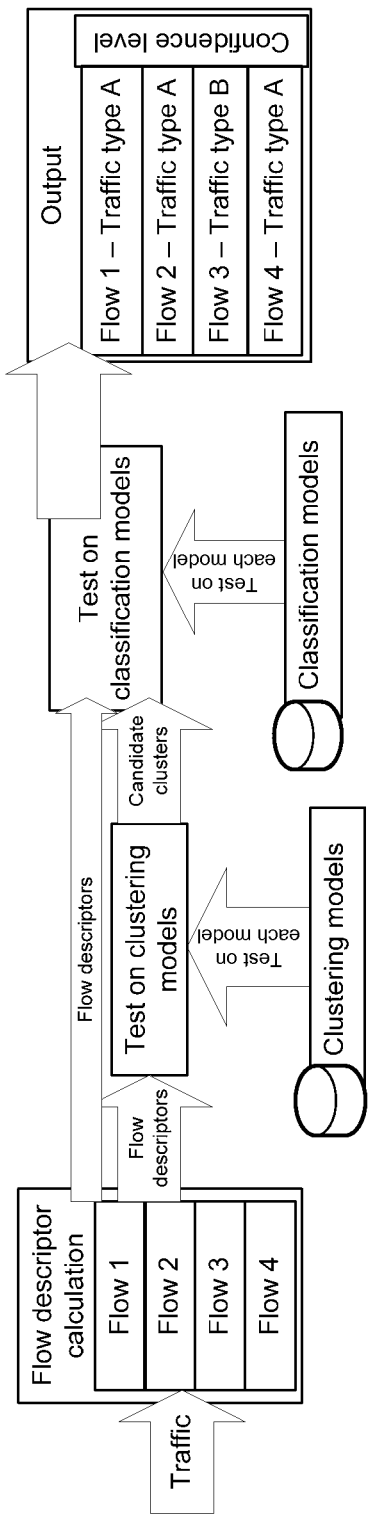
FIG. 8 is a non-limiting, example diagram illustrating functions outlined in FIG. 4.

FIG. 8 is a non-limiting, example diagram illustrating use of the created clustering and classification models to profile unknown traffic flows in accordance with the steps outlined in FIG. 4. A flow descriptor calculator receives at an input unknown "raw" traffic, which in this example includes four unknown packet traffic flows 1-4, and calculates traffic flow descriptors for each one of them. Flow descriptors are calculated in the same way as in the model creation process. Those flow descriptors are provided for test processing on each of the clustering models and each of the classification models determined in the model creation process of FIG. 7. The candidate clusters produced by each clustering model are provided to the classification models. The candidate clusters and the traffic flow descriptors are tested on each classification model to determine a finest candidate output that includes the traffic types, such as a point-to-point traffic flow, an e-mail traffic flow, a web traffic flow, and a voice over internet protocol (VoIP) traffic flow, for each flow along with a corresponding confidence level for each.

The inventors discovered that clustering and classification methods perform differently when used to identify unknown traffic flows on unknown networks. The results of the classification experiments are collected in Tables 1 and 2 below:

TABLE 1

Measured accuracy of clustering methods

| Method | Tested on same network | Cross-check on other networks |
|---|---|---|
| Expectation Maximalization (EM) | 85% | 65% |
| K-Means | 84% | 62% |
| Cobweb hierarchie clustering | 70% | 42% |
| Shared Nearest Neighbor Clustering | 95% (20% of the flows are clustered) | 93% (12% of the flows) |
| Autoclass | 79% | 55% |
| Constrained clustering | 88% | 48% |

TABLE 2

Measured accuracy of clustering methods

| Method | Tested on same network | Cross-check on other networks |
|---|---|---|
| SVM | 89% | 61% |
| Logistic Regression | 89% | 59% |
| Naive Bayes (complete pdf estimation) | 74% | 58% |
| Naive Bayes Simple (mix normal distributions) | 70% | 57% |
| Logit Boost | 86% | 54% |
| Random Forrest | 93% | 54% |
| Multilayer Perception | 85% | 47% |
| J48 | 90% | 45% |
| Bayes Net | 89% | 43% |

The first columns show the methods used for evaluations. The second columns show cases when the training data and the testing data are from the same network, the third columns show the case when the testing data is from a different network than the training data. The second and third columns show the results of the methods the parameter settings of which give the best accuracy in terms of the number of correctly-classified flows.

In case of clustering methods, the mapping of a specific cluster to an application is a majority decision. For example, if in the model creation stage, a cluster 5 contained 100 point-to-point (P2P) type traffic flows and 10 web type traffic flows, then during the traffic profiling stage, if a flow falls into cluster 5, it is profiled as a P2P type of traffic flow.

Clustering techniques were found to be more robust to network parameter changes, as compared to classification techniques. As a result, better accuracy is achieved when profiling traffic in a different network using clustering models as compared to using classification models. On the other hand, the inventors determined that classification algorithms can learn a specific network more accurately. Accordingly, developing and using classification models for flows of a same network achieves better accuracy than using clustering models. The model algorithms differ in learning speed and in the number of parameters to be set. A distance metric used in the clustering methods (e.g., see the metric calculation cost table in FIG. 7) does not affect performance significantly. Based on the tests and observations made by the inventors, they invented technology that achieves the advantages of both clustering and classification algorithms.

Two example ways of combining the clustering and classification methods are now described as part of the model creation stage (see FIG. 7). A first way is referred to as "trivia combination." The clustering result is fed to the classification models as a new feature. In this case, the information content of the feature can be taken into account by the classification learning algorithm. The advantage of this approach is that it is easy to implement.

Example features for use in the classification model creation process might include average payload size and average packet interarrival time extended with the cluster number that a specific traffic flow belongs to.

TABLE 3

| Flow number | Avg. payload size | Avg. packet interarrival time | cluster number |
|---|---|---|---|
| 1 | 554 | 0.002 | Cluster_2 |
| 2 | 500 | 0.1 | Cluster_3 |
| ... | ... | ... | ... |

A second example way of combining the clustering and classification methods is with a user-defined clustering tree (UDCT). After the clustering information is generated in FIG. 7, a separate classification model is built for the set of flows included in each cluster. In this case, there is no need to define a cluster to application mapping. This second approach showed significant improvement over the trivia combination approach because the clustering information is considered earlier in the decision tree of the classification model which allows subtrees to be ignored, thereby improving speed of the classification. The UDCT model combination approach is more storage consuming compared to the trivia combination classification models.

Table 4 below shows that both combined clustering and classification approaches improve performance when used in the same network and in different networks. The performance is superior as compared to the standalone cases in Tables 1 and 2 above.

TABLE 4

Measured accuracy of the combination of clustering and classification methods

| Method | Tested on same network | Cross-check on other networks |
|---|---|---|
| Trivia combination | 89% | 72% |
| UDCT | 93% | 75% |

The UDCT model combination approach, an Expectation Maximization (EM) clustering model algorithm, and a Support Vector Machine (SVM) classification model algorithm were selected to perform the experiments as these algorithms were the most robust for the case when the training and testing data were from different networks. The focus of the machine learning (ML)-algorithms is slightly different in the clustering and classification case. Clustering calculates Euclidean distances. SVM is a kernel-based algorithm that projects data into a high dimension "feature space," where the feature instances are separated using hyperplanes. One SVM task is to choose an appropriate kernel function. To extend the linear clustering models that the Expectation Maximization (EM) clustering model algorithm can learn, SVM implementations can be tuned to use Gaussian or polynomial kernels. With such kernels, it is possible to model non-linear, but exponential dependence of variables. As a result, the clustering and classification models can complement each other's capabilities with linear and non-linear modeling features.

Figure 9:
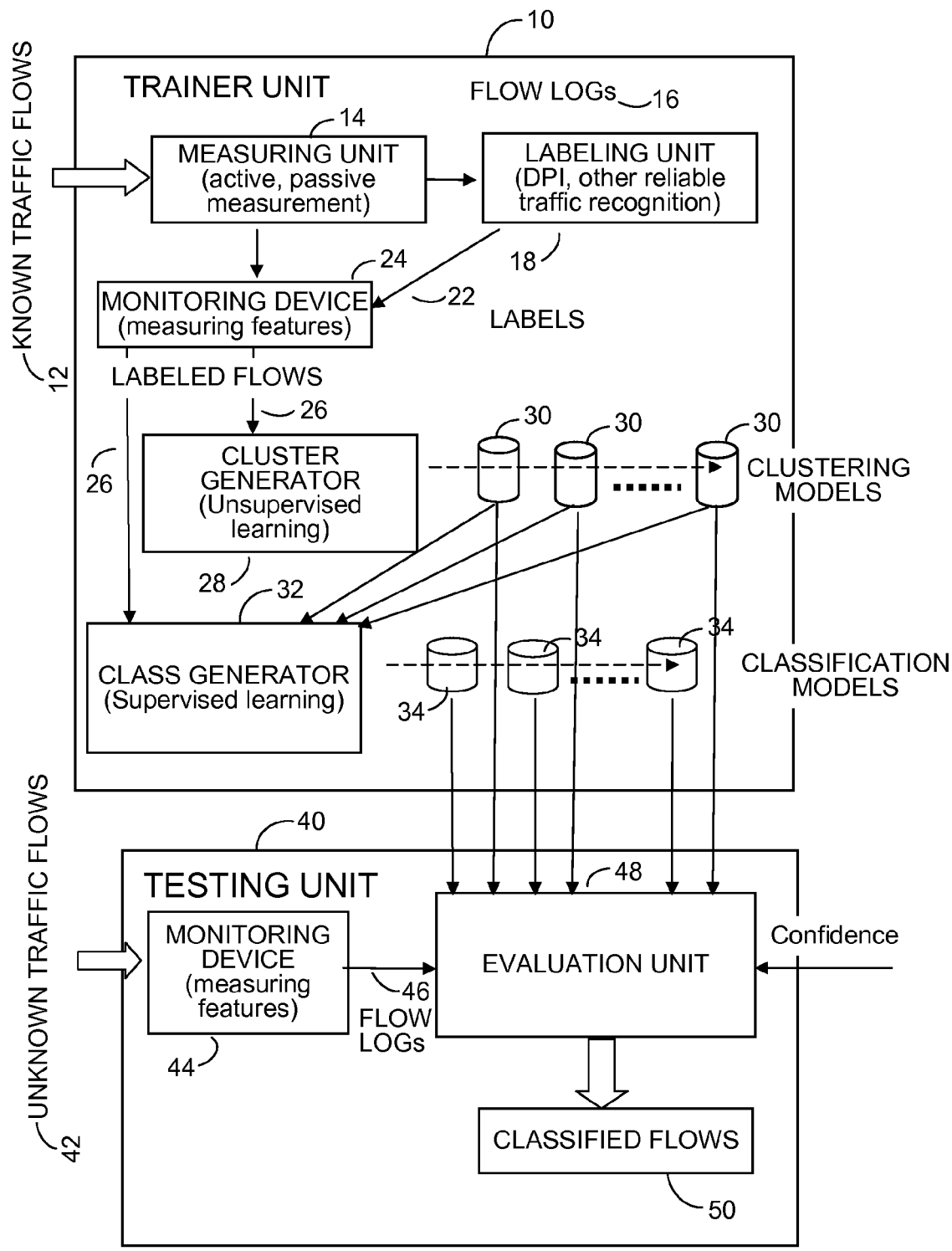
FIG. 9 is a non-limiting, example of apparatus for training and profiling multiple packet traffic flows.

FIG. 9 is a non-limiting, example function block diagram of a trainer unit 10 and profiling unit 40 for respectively performing the packet traffic flow clustering and classification model creation and packet traffic flow profiling functions based on those created models as outlined in FIGS. 3 and 4. Known packet traffic flows 12 are provided to/received at a trainer unit 10 at a measuring unit 14, which may perform passive and/or active traffic flow measurement functions to create traffic flow logs 16, each flow log comprising a flow furnished with a flow identifier. A labeling processor 18 receives the flow logs 16 and performs deep packet inspection of the flows (or other reliable traffic recognition analysis) to apply labels 22 (actual values like application, protocol, user activity, terminal type, and network condition) that match the inspected packets of each packet traffic flow. A monitoring device 24 measures features (e.g., avg IAT, psize dev, sum byte, time len, etc.) of each traffic flow and provides the labels and features to a cluster processor 28 that analyzes that information using an unsupervised machine learning algorithm to generate multiple clustering models stored in cluster model memory 30, where each cluster model has corresponding cluster information. A classification model generator 32 receives the labels and features 26 along with clustering information from the created clustering models to create classification models using a supervised machine learning algorithm and stores them in classification model memory 34.

A profiling unit or module 40 receives unknown traffic flows 42 at a monitoring device 44 which determines features for each traffic flow and generates a corresponding flow log for each flow. The profiling unit 40 may be in the same node or a different node as the trainer unit 10. An evaluation processor 48 receives the flow logs 46 from the monitoring device 44, a confidence factor for each flow log, and the clustering and classification models 30 and 34. All of this information is processed by the evaluation unit. The evaluation processor 48 may, in a preferred example embodiment, employ an expert system to perform the model evaluation. An example expert system may be based on the well known Dempster-Shafer (D-S) decision making. The outputs of the evaluation processor 48 are flow types classifying each of the unknown packet traffic flows 42.

Figure 10:
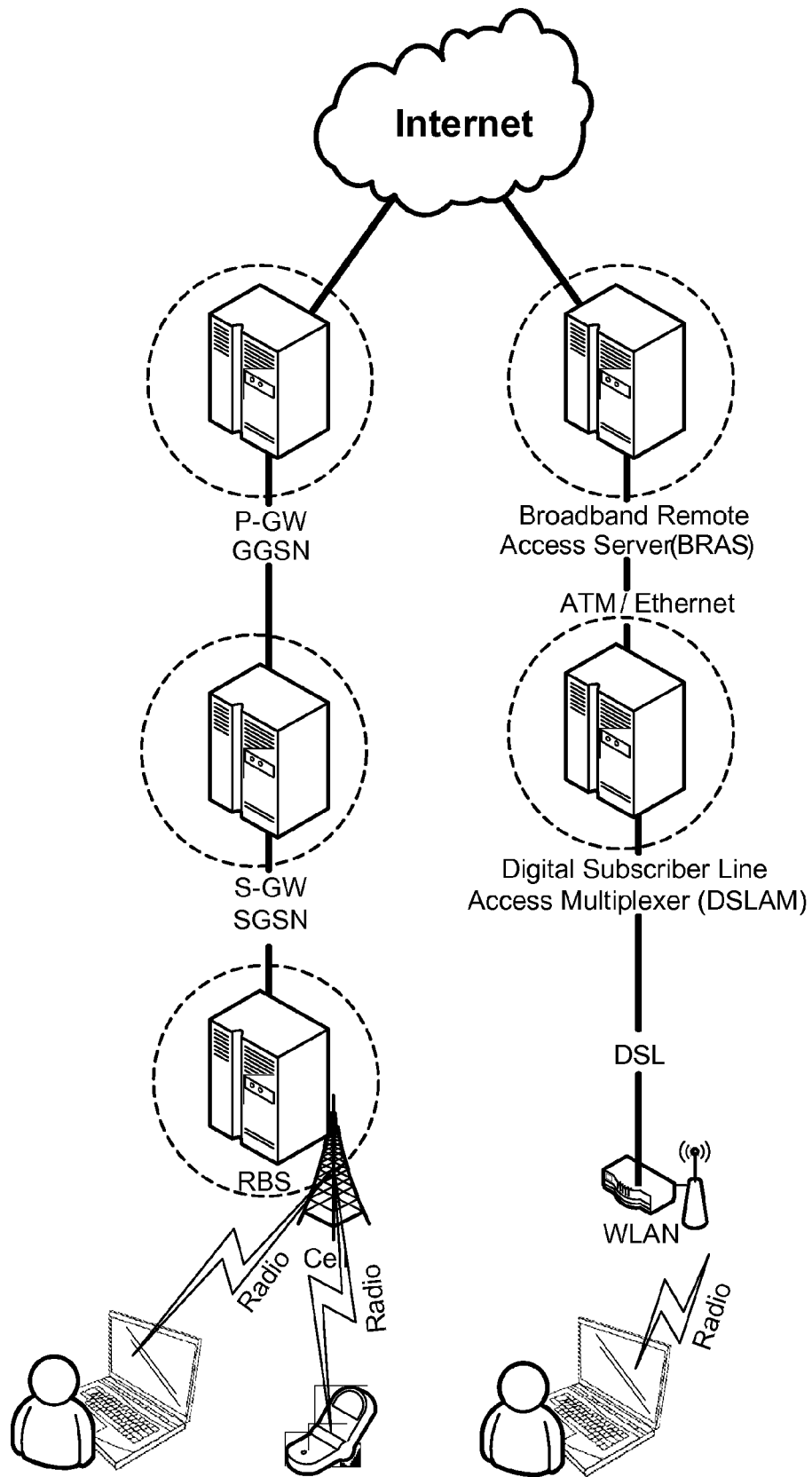
FIG. 10 is a non-limiting, example of a communications system illustrating various nodes in which the model generation and/or traffic profiling may be employed.

FIG. 10 is a non-limiting, example of a communications system illustrating various nodes in which the model generation and/or traffic profiling may be employed. The illustrated example network nodes that can support one or both of the training and profiling units may observe the packet traffic of several users and thus are circled. They include a radio base station, a Serving GPRS Support Node (SGSN), Gateway GPRS Support Node (GGSN), Broadband Remote Access Server (BRAS), or Digital Subscriber Line Access Multiplexer (DSLAM). Although also possible as an implementation node, the WLAN access point is a very low aggregation point and thus is not circled as are the other nodes. Of course, the technology may be used in other suitable network nodes.

The technology advantageously only requires processing packet header information, and thus, can also deal with encrypted traffic since payload encryption does not affect the traffic characteristics. There is no need to define functions which determine the cluster-to-label mapping. One such function is to cluster all data in the testing phase to the same label which most frequently occurred during the training phase in the specific cluster. But such functions may result in biased results when the cluster is actually inhomogeneous considering the label types. In contrast, the supervised learning methods described above can do this mapping automatically.

Increased accuracy and performance are achieved in the creation and use of traffic profiling models by exploiting the particular advantages associated with unsupervised learning and the particular advantages associated with supervised learning and minimizing their respective particular disadvantages. The clustering and classification models can extend each other's capability with linear and non-linear modeling features. For example, a less complex EM clustering model can deal with the linear dependent features while a more complex SVM classification model can neglect such linear dependent features and focus on modeling of non-linearly dependent features.

The clustering results may also be used as normalized, compressed, and robust input of a high dimensional data. Dimensional data refers to an abstraction where each flow is a point high dimension space and each feature corresponds to a dimension in that high dimension space. A normalized output of the clustering models may be provided along with the traffic type for each of the unknown packet traffic flows from the classification models.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method performed by a computer for creating multiple packet traffic clustering models and multiple packet traffic classification models, comprising:
   processing multiple known packet traffic flows to determine for each known packet traffic flow multiple traffic flow descriptors describing physical parameters of the known packet traffic flow and at least one traffic flow label describing a type of packet traffic flow;
   selecting a subset of the traffic flow descriptors as traffic flow features for each of the known packet traffic flows;
   associating each of the known packet traffic flows with corresponding selected traffic flow features;
   using computer-implemented unsupervised learning to define traffic flow clustering models by processing the traffic flow features associated with each of the known packet traffic flows;
   using computer-implemented supervised learning to create traffic classification models based on the defined traffic flow clustering models, the traffic flow features, and the traffic flow label associated with each of the known packet traffic flows; and
   storing the traffic clustering models and the traffic classification models in memory.

2. The method in claim 1, wherein the traffic flow features include for each of the known packet traffic flows one or more of: average packet inter-arrival time, packet size deviation, sum of bytes, time duration, TCP flags set, packet direction, a number of packet direction changes, a number of transported packets until a first packet direction change, or a statistically-filtered time series.

3. The method in claim 1, wherein the type of packet traffic flow includes one of: a point-to-point traffic flow type, an e-mail traffic flow type, a web traffic flow type, and a voice over internet protocol (VoIP) traffic flow type.

4. The method in claim 1, further comprising determining the at least one label for each of the known packet traffic flows by deep packet inspection of packets in that known packet traffic flow.

5. The method in claim 1, wherein unsupervised learning includes one or more of the following techniques: expectation maximization, K-Means, cobweb hierarchic clustering, shared neighbor clustering, and constrained clustering.

6. The method in claim 1, wherein supervised learning includes one or more of the following techniques: Support Vector Machine (SVM), logistic regression, naive Bayes, naive Bayes simple, logit boost, random forest, multilayer perception, J48, and Bayes net.

7. The method in claim 1, wherein the computer-implemented supervised learning includes processing the clustering model as a new traffic flow feature associated with one or more of the known packet traffic flows.

8. The method in claim 7, further comprising performing a cluster-to-application mapping, where the application refers to one or more computer applications used to generate the packet traffic flows, and wherein the processing of the clustering model as the new traffic flow feature is performed after the cluster-to-application mapping.

9. The method in claim 1, wherein the computer-implemented supervised learning includes individually processing each of multiple clustering models without performing a cluster-to-application mapping, where the application refers to one or more computer applications used to generate the packet traffic flows.

10. The method in claim 1, wherein the traffic clustering models classify packet traffic flows into clusters.

11. The method in claim 1, wherein the method is implemented in or connected to one or more of the following: a radio base station, a Serving GPRS Support Node (SGSN), Gateway GPRS Support Node (GGSN), Broadband Remote Access Server (BRAS), or Digital Subscriber Line Access Multiplexer (DSLAM).

12. A method for profiling packet traffic flows, comprising:
receiving, by one or more computers, one or more unknown packet traffic flows and associating each unknown packet traffic flow with multiple traffic flow descriptors describing physical parameters of the unknown packet traffic flow;
selecting and associating, by the one or more computers, a subset of the traffic flow descriptors as corresponding traffic flow features for each of the unknown packet traffic flows; and
processing, by the one or more computers, the corresponding traffic flow features for each of the unknown packet traffic flows using one or more traffic clustering models developed using unsupervised learning based on known packet traffic flows and one or more traffic classification models developed using supervised learning based on the known packet traffic flows to determine a traffic type for each of the unknown packet traffic flows.

13. The method in claim 12, wherein the determined traffic type is associated with a confidence value that includes a packet traffic profiling accuracy.

14. The method in claim 12, wherein the packet traffic flow features include one or more of the following for each of the unknown packet ticket traffic flows: average packet inter-arrival time, packet size deviation, sum of bytes, time duration, TCP flags, packet direction, a number of packet direction changes, a number of transported packets until a first packet direction change, or a statistically-filtered time series.

15. The method in claim 12, wherein the traffic type includes one of: a point-to-point traffic flow type, an e-mail traffic flow type, a web traffic flow type, and a voice over internet protocol (VoIP) traffic flow type.

16. The method in claim 12, wherein the processing of the selected traffic flow features includes:
testing the unknown packet traffic flows by applying them to the one or more traffic clustering models, and
selecting the one or more traffic classification models based on an output of the one or more traffic clustering models.

17. The method in claim 12, wherein the method is implemented in or connected to one or more of the following: a radio base station, a Serving GPRS Support Node (SGSN), Gateway GPRS Support Node (GGSN), Broadband Remote Access Server (BRAS), or Digital Subscriber Line Access Multiplexer (DSLAM).

18. An apparatus for creating multiple packet traffic profiling clustering models and multiple packet traffic classification models, comprising:
a receiving port for receiving multiple known packet traffic flows;
a monitoring processor configured to determine for each known packet traffic flow multiple traffic flow descriptors describing physical parameters of the known packet traffic flow and at least one traffic flow label describing a type of packet traffic flow;
a selecting processor configured to select and associate a subset of the traffic flow descriptors as corresponding traffic flow features for each of the known packet traffic flows;
a cluster data processor configured to use unsupervised learning to automatically define traffic flow clustering models by processing the corresponding traffic flow features associated with each of the known packet traffic flows;
a classification data processor configured to use supervised learning to automatically create traffic classification models based on the defined traffic flow clustering models, the traffic flow features, and the traffic flow label associated with each of the known packet traffic flows; and
a memory for storing the traffic clustering models and the traffic classification models.

19. The apparatus in claim 18, wherein the traffic flow features include for each of the known packet traffic flows one or more of: average packet inter-arrival time, packet size deviation, sum of bytes, time duration, TCP flags set, packet direction, a number of packet direction changes, a number of transported packets until a first packet direction change, or a statistically-filtered time series.

20. The apparatus in claim 18, wherein the type of packet traffic flow includes one of: a point-to-point traffic flow type, an e-mail traffic flow type, a web traffic flow type, and a voice over internet protocol (VoIP) traffic flow type.

21. The apparatus in claim 18, wherein the monitoring processor is configured to determine the at least one label for each of the known packet traffic flows by deep packet inspection of packets in that known packet traffic flow.

22. The apparatus in claim 18, wherein unsupervised learning includes one or more of the following techniques: expectation maximization, K-Means, cobweb hierarchic clustering, shared neighbor clustering, and constrained clustering.

23. The apparatus in claim 18, wherein supervised learning includes one or more of the following techniques: Support Vector Machine (SVM), logistic regression, naive Bayes, naive Bayes simple, logit boost, random forest, multilayer perception, J48, and Bayes net.

24. The apparatus in claim 18, wherein the cluster data processor is configured to classify traffic flows into clusters.

25. The apparatus in claim 18 implemented in one or more of the following: a radio base station, a Serving GPRS Support Node (SGSN), a Gateway GPRS Support Node (GGSN), a Broadband Remote Access Server (BRAS), or a Digital Subscriber Line Access Multiplexer (DSLAM).

26. An apparatus for profiling packet traffic flows, comprising:
- an evaluation data processor configured to evaluate one or more unknown packet traffic flows and to associate each unknown packet traffic flow with multiple traffic flow descriptors describing physical parameters of the unknown packet traffic flow;
- a selection unit configured to select a subset of the traffic flow descriptors as corresponding traffic flow features to be associated with each of the unknown packet traffic flows; and
- a profiling data processor configured to process the corresponding traffic flow features for each of the unknown packet traffic flows using one or more traffic clustering models developed using unsupervised learning based on known packet traffic flows and one or more traffic classification models developed using supervised learning based on the known packet traffic flows to determine a traffic type for each of the unknown packet traffic flows.

27. The apparatus in claim 26, wherein the determined traffic type is associated with a confidence value that includes a packet traffic profiling accuracy.

28. The apparatus in claim 26, wherein the packet traffic flow features include for each of the unknown packet traffic flows one or more of: average packet inter-arrival time, packet size deviation, sum of bytes, time duration, TCP flags set, packet direction, a number of packet direction changes, a number of transported packets until a first packet direction change, or a statistically-filtered time series.

29. The apparatus in claim 26, wherein the traffic type includes one of: a point-to-point traffic flow type, an e-mail traffic flow type, a web traffic flow type, and a voice over internet protocol (VoIP) traffic flow type.

30. The apparatus in claim 26, wherein the profiling data processor is configured to:
- test the unknown packet traffic flows by applying them to the one or more traffic clustering models, and
- select the one or more traffic classification models based on an output of the one or more traffic clustering models.

31. The apparatus in claim 26, implemented in or connected to one or more of the following: a radio base station, a Serving GPRS Support Node (SGSN), Gateway GPRS Support Node (GGSN), Broadband Remote Access Server (BRAS), or Digital Subscriber Line Access Multiplexer (DSLAM).

* * * * *

UNITED STATES PATENT AND TRADEMARK OFFICE
CERTIFICATE OF CORRECTION

| | | |
|---|---|---|
| PATENT NO. | : 8,817,655 B2 | Page 1 of 1 |
| APPLICATION NO. | : 13/277735 | |
| DATED | : August 26, 2014 | |
| INVENTOR(S) | : Szabo et al. | |

It is certified that error appears in the above-identified patent and that said Letters Patent is hereby corrected as shown below:

In the Claims

In Column 13, Line 54, in Claim 14, delete "flags," and insert -- flags set, --, therefor.

Signed and Sealed this
Nineteenth Day of May, 2015

Michelle K. Lee
*Director of the United States Patent and Trademark Office*